United States Patent
Aamodt et al.

(10) Patent No.: US 7,404,067 B2
(45) Date of Patent: Jul. 22, 2008

(54) METHOD AND APPARATUS FOR EFFICIENT UTILIZATION FOR PRESCIENT INSTRUCTION PREFETCH

(75) Inventors: Tor M. Aamodt, Sants Clara, CA (US); Hong Wang, San Jose, CA (US); Per Hammarlund, Hillsboro, OR (US); John P. Shen, San Jose, CA (US); Steve Shih-wei Liao, San Jose, CA (US); Perry H. Wang, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 326 days.

(21) Appl. No.: 10/658,072

(22) Filed: Sep. 8, 2003

(65) Prior Publication Data

US 2005/0055541 A1 Mar. 10, 2005

(51) Int. Cl.
*G06F 9/38* (2006.01)
*G06F 9/46* (2006.01)

(52) U.S. Cl. ...................... 712/219; 712/228
(58) Field of Classification Search ................ 712/219, 712/245, 228
See application file for complete search history.

(56) References Cited

U.S. PATENT DOCUMENTS

| | | | | |
|---|---|---|---|---|
| 5,353,418 A | * | 10/1994 | Nikhil et al. | 718/108 |
| 5,724,565 A | * | 3/1998 | Dubey et al. | 712/245 |
| 6,289,343 B1 | * | 9/2001 | Freund et al. | 707/8 |
| 6,694,346 B1 | * | 2/2004 | Aman et al. | 718/104 |
| 2003/0204778 A1 | * | 10/2003 | Wilding et al. | 714/19 |

* cited by examiner

Primary Examiner—Daniel Pan
(74) Attorney, Agent, or Firm—Shireen I. Bacon

(57) ABSTRACT

Embodiments of an apparatus, system and method enhance the efficiency of processor resource utilization during instruction prefetching via one or more speculative threads. Renamer logic and a map table are utilized to perform filtering of instructions in a speculative thread instruction stream. The map table includes a yes-a-thing bit to indicate whether the associated physical register's content reflects the value that would be computed by the main thread. A thread progress beacon table is utilized to track relative progress of a main thread and a speculative helper thread. Based upon information in the thread progress beacon table, the main thread may effect termination of a helper thread that is not likely to provide a performance benefit for the main thread.

4 Claims, 9 Drawing Sheets

METHOD AND APPARATUS FOR EFFICIENT UTILIZATION FOR PRESCIENT INSTRUCTION PREFETCH

BACKGROUND

1. Technical Field

The present disclosure relates generally to information processing systems and, more specifically, to enhancing the efficiency of processor resource utilization during prefetching of instruction information via helper threads.

2. Background Art

In order to increase performance of information processing systems, such as those that include microprocessors, both hardware and software techniques have been employed. On the hardware side, microprocessor design approaches to improve microprocessor performance have included increased clock speeds, pipelining, branch prediction, superscalar execution, out-of-order execution, and caches. Many such approaches have led to increased transistor count, and have even, in some instances, resulted in transistor count increasing at a rate greater than the rate of improved performance.

Rather than seek to increase performance solely through additional transistors, other performance enhancements involve software techniques. One software approach that has been employed to improve processor performance is known as "multithreading." In software multithreading, an instruction stream is split into multiple instruction streams, or "threads", that can be executed concurrently.

In one approach, known as time-slice multithreading or time-multiplex ("TMUX") multithreading, a single processor switches between threads after a fixed period of time. In still another approach, a single processor switches between threads upon occurrence of a trigger event, such as a long latency cache miss. In this latter approach, known as switch-on-event multithreading, only one thread, at most, is active at a given time.

Increasingly, multithreading is supported in hardware. For instance, processors in a multi-processor system, such as a chip multiprocessor ("CMP") system, may each act on one of the multiple threads concurrently. In another approach, referred to as simultaneous multithreading ("SMT"), a single physical processor is made to appear as multiple logical processors to operating systems and user programs. In SMT, multiple threads can be active and execute concurrently on a single processor without switching. That is, each logical processor maintains a complete set of the architecture state, but many other resources of the physical processor, such as caches, execution units, branch predictors, control logic and buses are shared. With CMP and SMT approaches, the instructions from multiple threads execute concurrently and may make better use of shared resources than TMUX multithreading or switch-on-event multithreading.

Even in processors that utilize multithreading to increase performance, a performance penalty is paid during the latency period associated with fetching of instruction information. While such performance penalties may be ameliorated via instruction prefetching, performance penalties are nonetheless incurred when there is contention among execution resources during prefetching operations.

BRIEF DESCRIPTION OF THE DRAWINGS

The present invention may be understood with reference to the following drawings in which like elements are indicated by like numbers. These drawings are not intended to be limiting but are instead provided to illustrate selected embodiments of a method, apparatus and system for enhancing the effectiveness of resource utilization during prefetching of instruction information via helper threads.

DETAILED DESCRIPTION

Figure 1:
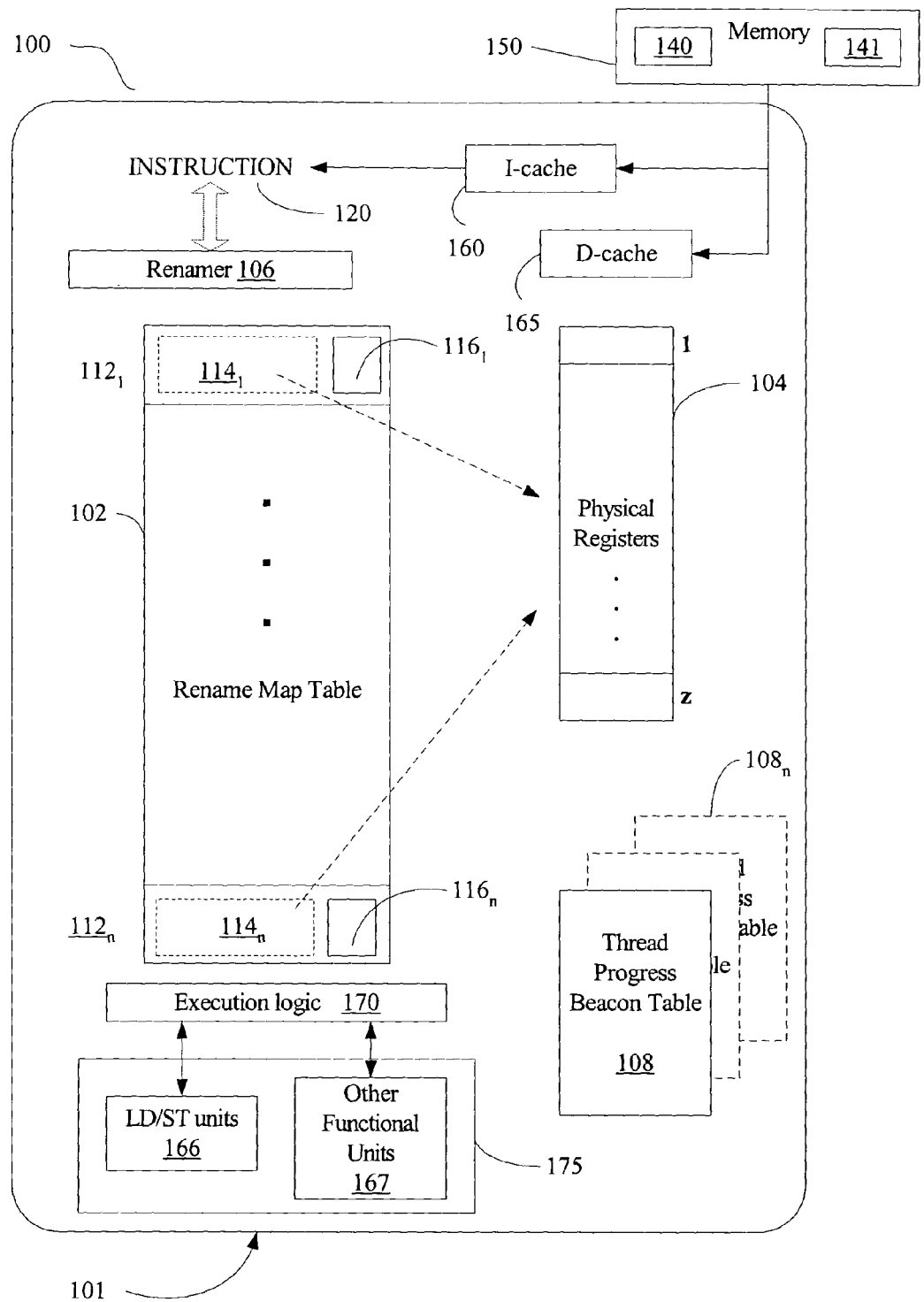
FIG. 1 is a block diagram of at least one embodiment of a processing system capable of utilizing disclosed techniques.

Described herein are selected embodiments of a system, apparatus and methods for enhancing the effectiveness of resource utilization during instruction prefetch via speculative helper threads. During execution of a single-threaded application, referred to as a main thread, the hardware that supports multithreading is, at times, not utilized and remains idle. During such times, idle multithreading hardware may be utilized to execute one or more "helper threads" to pre-fetch instruction information (assuming that the execution path for the main thread has been accurately determined).

In the following description, numerous specific details such as processor types, spawning pair selection methods, context switch methodology, cache configurations, control flow ordering, and speculative precomputation techniques have been set forth to provide a more thorough understanding of the present invention. It will be appreciated, however, by one skilled in the art that the invention may be practiced without such specific details. Additionally, some well-known structures, circuits, and the like have not been shown in detail to avoid unnecessarily obscuring the present invention.

"Prescient" instruction prefetch is a manner of pre-fetching, via one or more speculative helper threads, instructions of a main program. For at least one embodiment of prescient instruction prefetching, a helper thread is dynamically spawned at a spawn point to execute a helper thread concurrently with the main thread. This helper thread may speculatively execute main thread instructions at a future point, called the target point, in relation to the spawn point.

In traditional speculative precomputation for data cache prefetching, the helper thread is a subset of instructions from the original program flow. The subset includes instructions relevant only to the address computation of a load instruction that is expected to suffer a cache miss in the main thread. In contrast, the helper thread for prescient instruction prefetching may preexecute, starting at a distant target point, the same program code that the main thread is likely to fetch and execute in the near future. As such, the helper thread may contend with the main thread for execution resources as the helper thread precomputes branch outcomes. Such contention is a potential side effect of prescient instruction prefetching that may not be entirely avoidable simply by tuning spawn-target pair selection alone.

In addition, other resource contention issues may also arise during instruction prefetching. These other contention issues lead to inefficiencies in the helper thread execution. For example, certain inefficiencies may be encountered when a helper thread executes ineffectual instructions. An instruction is considered "ineffectual" in this context if it is unrelated to resolving any branch instructions in the helper thread.

Inefficiencies may be further encountered if the main thread surpasses a helper thread that "lags behind" such that further execution of the helper thread is unlikely to be profitable. Continued execution of such lagging helper threads consumes resources and may thus slow execution of the main thread.

Elimination or effective minimization of these "ineffectual instruction" and "lagging helper thread" resource contention inefficiencies may result in the helper thread prefetching instructions along the future path that the main thread is likely to traverse, while at the same time executing the smallest subset of these instructions that contribute to computing outcomes for certain critical branches. Embodiments of the method and apparatus disclosed herein address these and other concerns related to prefetch of instruction information via speculative pre-execution by a helper thread.

Prescient instruction prefetching exploits multithreaded hardware to improve application performance by performing judicious and timely (or "prescient") instruction prefetching. As used herein, the term "prescient prefetch" connotes at least two specific aspects of instruction prefetching. First, speculative prefetching helper threads are spawned timely and judiciously based upon a global understanding of program behavior. Secondly, the work performed by helper threads relies upon precomputation of live-in values to accurately predict future program behavior.

Regarding timely and judicious spawning of speculative prefetching helper threads, profile information is used to identify code regions in a main thread application (typically a single-threaded application) that are likely to incur at least a predetermined amount of performance loss due to I-cache misses. A target point is identified within each code region. For each target point identified in the software application, a corresponding spawn point is identified that can serve as a triggering point for initiating the execution of a helper thread for instruction prefetching. Once a spawn-target pair is identified, a helper thread is generated and may be attached to the original application (i.e., the main thread) binary file. When a trigger instruction at a spawn point is encountered in the main thread at run-time, a helper thread is spawned to begin execution in an idle thread context at the target point. The execution of the helper thread effectively prefetches for anticipated I-cache misses along a relatively short path subsequent to the target point.

To effectively prefetch future instruction streams for the main thread into an instruction cache, the helper threads attempts to correctly resolve control flow for the main thread instructions. As is stated above, helper threads rely upon precomputation of live-in values to accurately predict future program behavior. Accordingly, the helper thread accesses a set of live-in register and memory values from the main thread that are used by the helper thread during its processing.

A brief preliminary discussion of register renaming provides helpful background information regarding the present disclosure. Compiled or assembled software instructions reference certain architectural registers defined in the instruction set for a target processor. The instruction set for a processor typically includes a limited number of available architectural registers (the number of architectural registers being less than the number of physical registers available in the processor). As a result, the same architectural register is often used in compiled code to represent many different variables, although an architectural register represents only one variable is at any given time. Because the same register is used to represent different variables, the values of these variables are independent.

Register renaming is the remapping (renaming) of architectural registers to physical registers. For certain processors, such as those that allow instructions to issue out of order, register renaming is used to increase the number of instructions that a superscalar processor can issue in parallel.

Superscalar processors may attempt to exploit instruction level parallelism by issuing multiple instructions in parallel, thus improving performance. Register renaming improves performance of code not specifically compiled for a superscalar processor because such code tends to use architectural registers in ways that reduce the amount of parallelism available.

Renaming each independent definition of an architectural register to different physical registers improves parallelism by preventing dependence-induced delays. Renaming removes WAR (write-after-read) and WAW (write-after-write) dependencies and allows multiple independent instructions that write to the same architectural register to issue concurrently. Renaming in an out-of-order machine thus removes output and anti-dependencies and therefore eliminates those stalls in an out-of-order machine that would otherwise exist due to architectural register re-use.

Register renaming is also used in certain processors, such as the Itanium® and Itanium® 2 microprocessors available from Intel Corporation, that issue instructions in program order. For such processors, instructions are issued in groupings, called bundles. While processors such as the Itanium® and Itanium® 2 microprocessors do not issue instructions out of order, they nonetheless utilize renaming to support register windowing and register rotation.

For such processors, portion of the registers in the processor is utilized to implement a register stack to provide fresh registers, called a register frame (also referred to as a "window"), when a procedure is called with an alloc instruction. For at least one embodiment, the first 32 registers of a 128-register register file are static, and the remaining 96 registers implement a register stack to provide fresh registers when an alloc instruction is executed (which typically occurs after a call instruction). One commonly-recognized benefit of register windowing is reduced call/return overhead associated with saving and restoring register values that are defined before a subroutine call, and used after the subroutine call returns.

To simplify keeping track of architectural registers versus physical registers, the Itanium® and Itanium® 2 microprocessors rename registers so that the portion of the general register file that supports renaming is addressed starting at Gr32 (the first non-static register). Though the register frame of any called function may start from any one of the physical registers Gr32-Gr128, every call, alloc, or return instruction renames the current starting physical register to Gr32. The naming of subsequent physical registers of the function's register frame continues, renaming the next physical registers to Gr33, Gr34 and so on. A procedure's register frame includes local and output registers. On a procedure call, the current stack frame's local registers are hidden and the output registers become part of the new procedure's local registers.

In addition to the benefits of register windowing mention above, such register renaming mechanism enables a register operation known as "register rotation", which is used in specialized optimizing constructs known as software pipelining to increase the amount of parallelism within a loop.

FIG. 1 illustrates a processing system 100 that includes a processor 101. The processor 101 includes renamer 106. Renamer 106 includes rename logic to help enhance the efficacy of prescient instruction prefetching via helper threads. At least one embodiment of the processor 101 also includes a storage structure called a map table 102.

For at least one embodiment, the map table 102 is similar to, and in some embodiments may be considered an extension of, the register alias table (RAT) mechanism used to implement traditional register renaming in an out-of-order processor.

A traditional register alias table includes an entry for each architectural register. The entry holds the identifier of the current physical register to which that architectural register has been mapped during renaming. However, the architectures of at least some embodiments of a processing system on which the present invention may be practiced may achieve register renaming without such a "one-to-one" table lookup mechanism such as a RAT. Rather, register renaming may occur via the use of combinational logic and a small set of registers that define the current mapping.

For example, it may be desirable to implement a register rename mechanism using arithmetic operations applied to a very small set of registers. The small set of registers may include a bottom of frame pointer and a current frame marker (sometimes respectively referred to as the BOF and CFM registers, respectively), which are used to specify to the current mapping of logical to physical registers. For such embodiments, each register is renamed by applying a predefined set of arithmetic operations to the current values of the architectural register identifier, the BOF and the CFM.

For embodiments that utilize a table lookup implementation, the map table 102 may be implemented as a rename map table to support register renaming. The entry slots $112_1$-$112_n$ of the map table 102 may thus include an optional register identifier field 114. The optional nature of the register identifier field 114 is denoted by broken lines in FIG. 1. The entry slots $112_1$-$112_n$ of the map table 102 also include a YAT-bit field 116, described below.

If the table lookup implementation is not used, then the processor includes a storage structure 102 that does not include the optional register identifier field 114. Instead, each entry slot 112 of the map table 102 merely includes a bit field, referred to as a YAT-bit field 116. YAT is an acronym for "yes-a-thing." Accordingly, although both in-order and out-of-order processor 101 embodiments may utilize a storage structure 102 that includes a YAT-bit field 116 as illustrated in FIG. 1, one of skill in the art will realize that the register identifier field 114 need not be present in order to practice all disclosed embodiments. Additionally, different types, names or encodings may be used to represent either or both of a field analogous to the YAT-bit field and other indicators such as the register identifier field.

Via the YAT-bit field 116 illustrated in FIG. 1, each architectural register identifier for the processor 101 may be associated with, in the map table 102, one bit of storage (referred to as the YAT-bit) which may be microarchitecturally read and written, and may be initialized architecturally. As described in further detail below, the YAT bit is essentially a type of validity bit. A "true" value in a YAT-bit field 116 indicates that the associated register's value is considered relevant and "accurate enough" to compute at least one future outcome of a branch instruction during instruction prefetching. The value in the YAT-bit field 116 thus indicates whether the corresponding physical register's content reflects the value that would be computed by the main thread when it executes instructions in the postfix region of a program (see 1102, FIG. 8).

To draw an analogy to existing features of the Itanium® and Itanium® 2 microprocessors available from Intel Corporation, the YAT-bit may be conceptualized as a special predicate value for the instruction writing the destination register associated with the YAT-bit. However, as is discussed in further detail below, the YAT-bit differs from predicate bits (also discussed in further detail below) in that the value of the YAT-bit is available at an earlier stage, the rename stage 308 (see FIG. 3), of the execution pipeline. (For at least one embodiment, when YAT-bits are used in combination with predication, the values of YAT-bits may be affected by the values of predicates, as is discussed in further detail below). FIG. 1 illustrates that the processor 101 includes execution logic 170 to provide for early termination of the instruction in the execution pipeline, based on the value of the YAT-bit value associated with the instruction's destination register(s). Rather than predicating instruction execution based on values that are computed in the program, the YAT-bit serves to predicate early termination of an instruction in the execution pipeline (see 300, FIG. 3) based primarily on the dataflow leading up to that instruction.

FIG. 1 illustrates that the processor 101 includes functional units 175. The functional units 175 include load and store units 166 to perform memory operations. The load and store units 166 may store and receive memory data that is temporarily stored in a data cache 165. The functional units 175 also includes other functional units 167. The other functional units 167 may include floating point and integer execution units, branch units, and the like.

The processor 101 also includes physical registers $104_1$-$104_z$. The renamer logic 106, map table 102 and physical registers 104 are all utilized for the purpose of register renaming.

Renamer logic 106 performs renaming by mapping an architectural register to a physical register 104. That is, for each occurrence of an architectural register in an instruction in the instruction stream of the processor 101, renamer logic 106 maps such occurrence to a physical register. As used herein, the term "instruction" is intended to encompass any type of instruction that can be understood and executed by functional units 175, including macro-instructions and micro-operations. One of skill in the art will recognize that renaming may be performed concurrently for multiple threads.

During renaming for architectural registers, at least one embodiment of the renamer logic 106 enters data into the map table 102. The map table 102 is a storage structure to hold one or more rename entries (see 208, FIG. 2). In practice, the actual entries of the map table 102 form a translation table that keeps track of mapping of architectural registers, which are defined in the instruction set, to physical registers 104. The physical registers 104 may maintain intermediate and architected data state for the architectural register being renamed.

Accordingly, it has been described that, for an embodiment utilizing a table lookup mechanism for renaming, the map table 102 and physical registers 104 facilitate renaming, by renamer logic 106, of architectural registers defined in an instruction set. The renaming may occur during a rename pipeline stage 308 (see FIG. 3).

Additional background information regarding predication is now presented. Predication is a method of converting control flow dependencies to data dependencies. The Explicitly Parallel Instruction Computing ("EPIC") architecture utilized by Itanium® and Itanium® 2 microprocessors features a set of 64 predicate registers to support conditional execution of instructions.

In general, a predicated instruction is associated with a single-bit "predicate" register that controls the execution of that instruction. The value in the predicate register indicates whether or not conditional execution of the associated instruction should occur. The processor commits the semantic results of a predicated instruction only if that instruction's predicate bit is true.

Not all processor architectures support predication. The techniques discussed herein may be practiced for processors that do support predication as well as on those processors that do not. In general, for a processor that supports predication, the maintenance of YAT-bit values takes into account the value of predicate bits. A method of maintaining and utilizing YAT-bit values in a processor that supports predication is discussed in further detail below in connection with FIG. 6.

Returning to FIG. 1, FIG. 1 illustrates that the processor 101 also includes a thread progress beacon table ("TPBT") 108. For at least one embodiment, the TPBT 108 is a content addressable memory (CAM) structure used to hold a limited set of instruction memory (virtual or physical) addresses. For at least one embodiment, the number of addresses maintained by the TPBT 108 is in the range of 8-16 addresses. For an alternative embodiment, the TPBT 108 is implemented as a set-associative cache.

Figure 2:
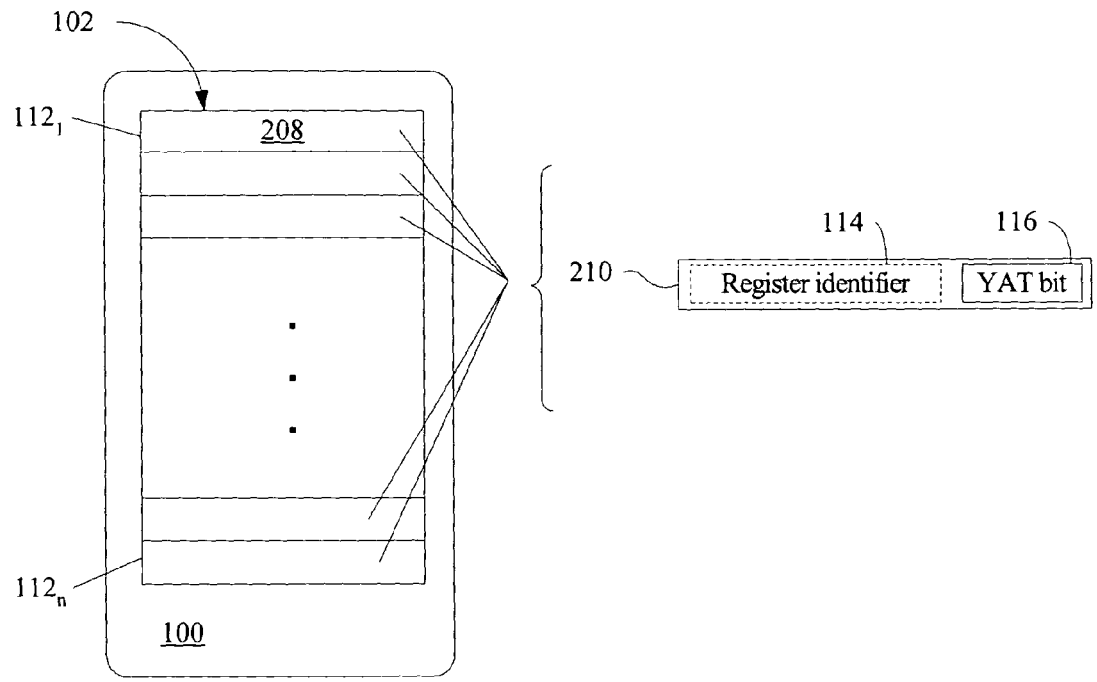
FIG. 2 is a block diagram illustrating the format of entries for at least one embodiment of a rename map table and a thread progress beacon table.
Figure 2:
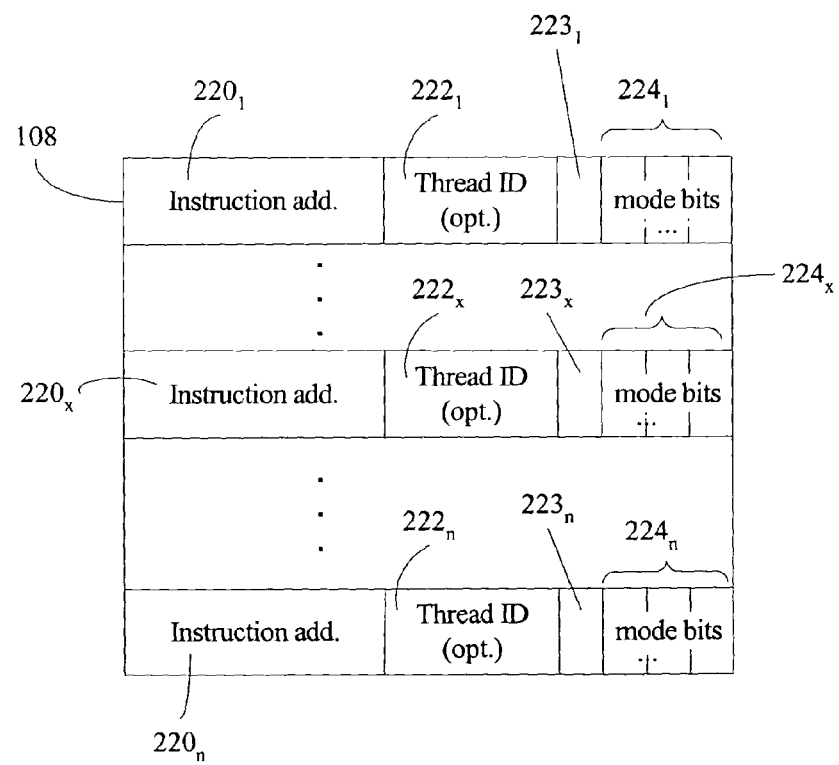

FIG. 2 illustrates the TPBT 108 in further detail. For at least one embodiment, the TPBT 108 may be implemented separately for each thread context. However, for at least one embodiment the TPBT 108 is shared among all physical thread contexts. In such an embodiment, the entries of the TPBT 108 include a thread identifier in an optional thread ID field 222.

In order to address the "lagging helper thread" inefficiency discussed above as well as other inefficiencies related to helper threading, the TPBT 108 maintains, in an instruction address field 220, an instruction memory address for a helper thread context. For at least one embodiment, the instruction address field 220 indicates the target point address (see 1104, FIG. 8) for a helper thread. The address in the instruction address field 220 serves as a beacon to be used in detecting whether the relative progress between a main thread and a helper thread indicates that the helper thread should be terminated for efficiency reasons.

That is, the main thread may send to the TPBT 108 its current instruction address, which is defined, for at least one embodiment, as the address of the next instruction or bundle that the main thread will retire. For pipelined microarchitectures, the current instruction address may be defined as the instruction address of an instruction or bundle at any fixed stage of the pipeline. If the main thread's instruction address hits in an entry of the TPBT 108, then next instruction pointer of the main context matches the target instruction of a helper thread context and the main thread has thus "caught up" with the helper thread.

For at least one embodiment, the address-matching check is performed by comparison logic of the TPBT 108 CAM. That is, the instruction address of each instruction or bundle retired by the main thread is sent to the TBPT 108. The comparison logic of the CAM compares the instruction address received from the main thread against the values in the instruction address field 220 of the current TPBT entries. If a match is found, then the "lag-kill" mode bit 223 for the matching entry is set to "true" to indicate that the helper thread that originally installed the matching TPBT entry should be killed due to the "lagging behind" condition indicated by the address match hit.

Accordingly, if the main thread catches up to a helper thread, then the helper thread may be killed. That is, a helper thread is useful in the context of instruction prefetching if it executes ahead of the main thread. If the main thread catches up with the helper thread, then the helper thread does not meet its purpose of prefetching instructions for the main thread. Instead, if the helper thread is permitted to continue execution, it may uselessly contend for resources with the main thread. Maintaining the TPBT 108 and using the information in the TPBT 108 to kill lagging helper threads are discussed in further detail below in connection with FIG. 4.

FIG. 2 further illustrates at least one embodiment of the format for actual entries 208 of the map table 102. Each actual entry 208 in an entry slot 112 is of the format 210 illustrated in FIG. 2. As used herein, the term "actual entry" 208 is used to refer to data. The term "entry slot" 112 is used to refer to a memory location in the map table 102 (FIG. 1) to store the actual entry 208. A slot 112 may or may not include valid data values. For instance, immediately after initialization, there may no actual entries 208 in the map table 102 (FIG. 2); that is, none of the entry slots $112_1$-$112_n$ will contain valid data immediately after initialization, such that there are n slots in the map table 102, but there are no actual entries 208 in the table 102.

As is discussed above, each actual entry 208 of the rename table 102 includes a value in the YAT-bit field 116. The value in the YAT-bit field 116 indicates whether the contents of the associated physical register are valid and may be used. If not, the instruction that indicates the register as a source or destination operand is not executed, thus potentially reducing execution resource contention. The YAT-bit value is thus utilized to direct instruction prefetching with higher accuracy. The initial values of the YAT-bit fields 116 of the map table 102 may be initialized when a helper thread is spawned.

For at least one embodiment, each entry slot 112 may include an optional register identifier field 114 along with YAT-bit field 116. During renaming, data representing an actual entry 208 is placed into the fields 114 (if present), and 116 of an entry 112 slot. For embodiments using the register identifier field 114 the actual entry 208 information placed into the entry slot 112 allows the processor 101 (FIG. 1) to locate the most recently-written value of one or more bits of the associated architectural register.

Figure 3:
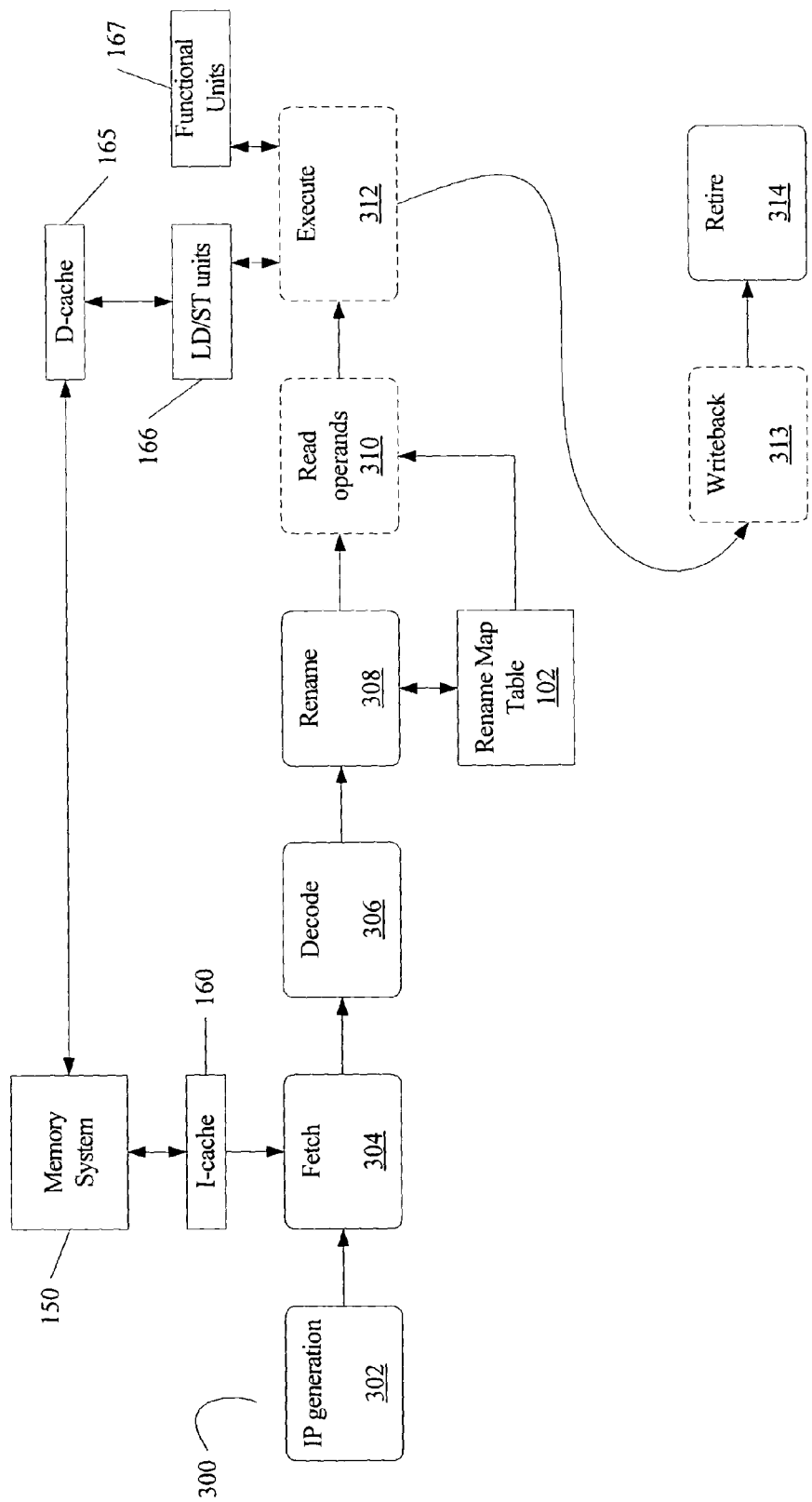
FIG. 3 is a data flow diagram illustrating an execution pipeline.

FIG. 3 illustrates that modification of the map table 102 may occur during a rename phase 308 of an execution pipeline 300. The illustrative pipeline 300 illustrated in FIG. 3 includes the following stages: instruction pointer generation 302, instruction fetch 304, instruction decode 306, register rename 308, operand read 310, execution 312, writeback 314, and instruction retirement 314. The pipeline 300 illustrated in FIG. 3 is illustrative only; the techniques described herein may be used on any processor that utilizes a rename stage 308. The stages of a pipeline 300 may appear in different order than that depicted in FIG. 3.

As long as the pipeline 300 includes a rename stage 308 (or multiple rename stages), the techniques disclosed herein may be utilized on a processor whose pipeline 300 may include different or additional pipeline stages to those illustrated in FIG. 3. For example, the pipeline 300 for a CISC-type (complex instruction set computing) processor may include a decode stage 306 that breaks down CISC instructions into micro-operations. In contrast, such decode stage 306 may not appear in the pipeline for a RISC-type (reduced instruction set computing) processor. Similarly, alternative embodiments of the pipeline 300 may include additional pipeline stages for rotation, expansion, exception detection, etc. In addition, a VLIW-type (very long instruction word) processor may include different pipeline stages, such as a word-line decode stage, than appear in the pipeline for a processor that includes variable-length instructions in its instruction set.

FIG. 3 illustrates that changes to the map table 102 may be effected during the rename pipeline stage 308 for an instruction I. These changes may affect whether or not instruction I is processed through the execution 312 and writeback 314 stages. In addition, these changes to the map table 102 that are effected during the rename stage 308 may also drive whether or not instruction I reads operands at the operand read stage 310. Further discussion of the modifications to the map table 102 that take place, according to at least one embodiment, during the rename stage 308 are discussed in further detail below in connection with FIGS. 4, 5 and 6.

Figures 4, 4A:
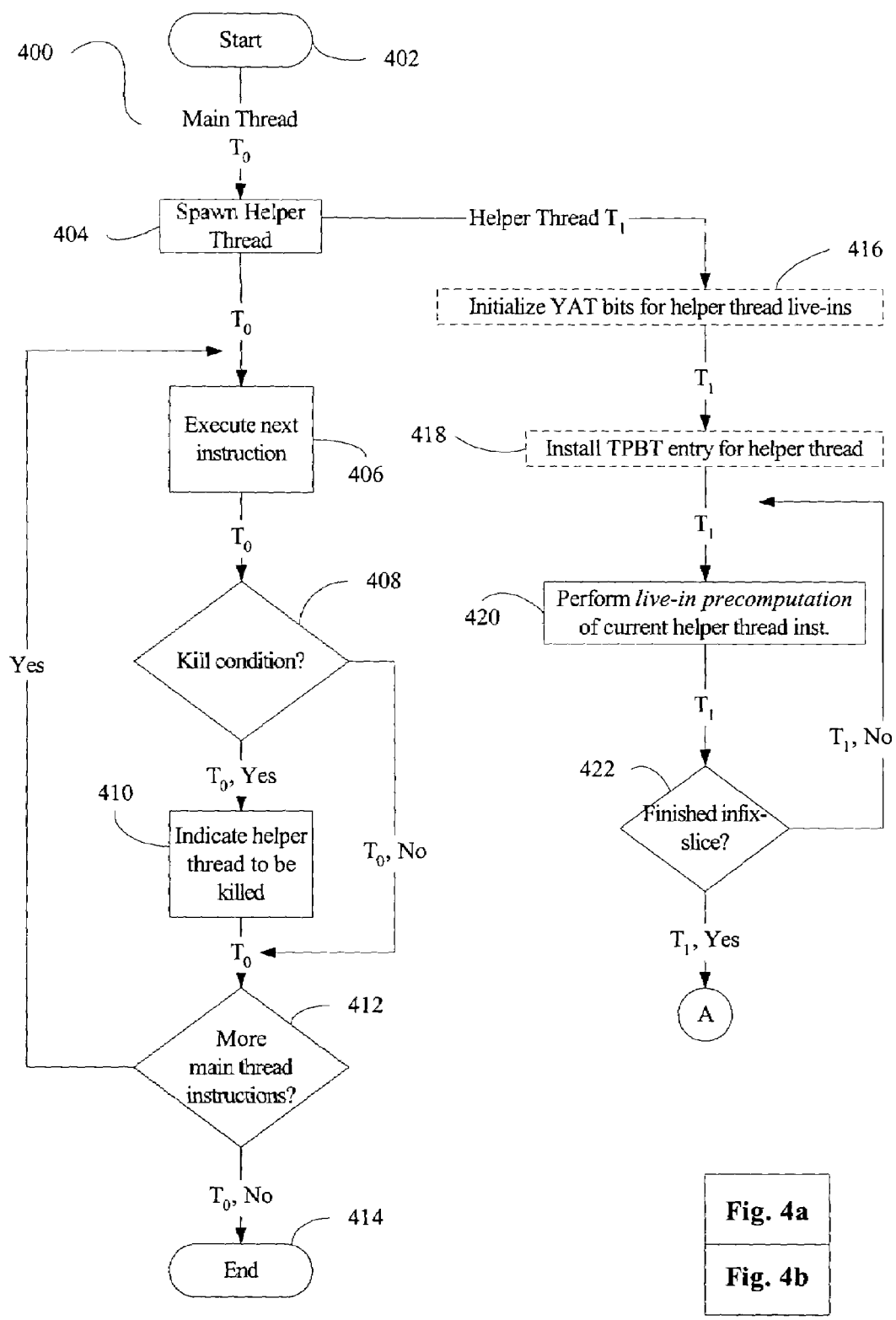
FIG. 4, including
FIG. 4a and FIG. 4b, is a flowchart illustrating at least one embodiment of a method for performing efficient instruction prefetching via helper threads.
Figure 4B:
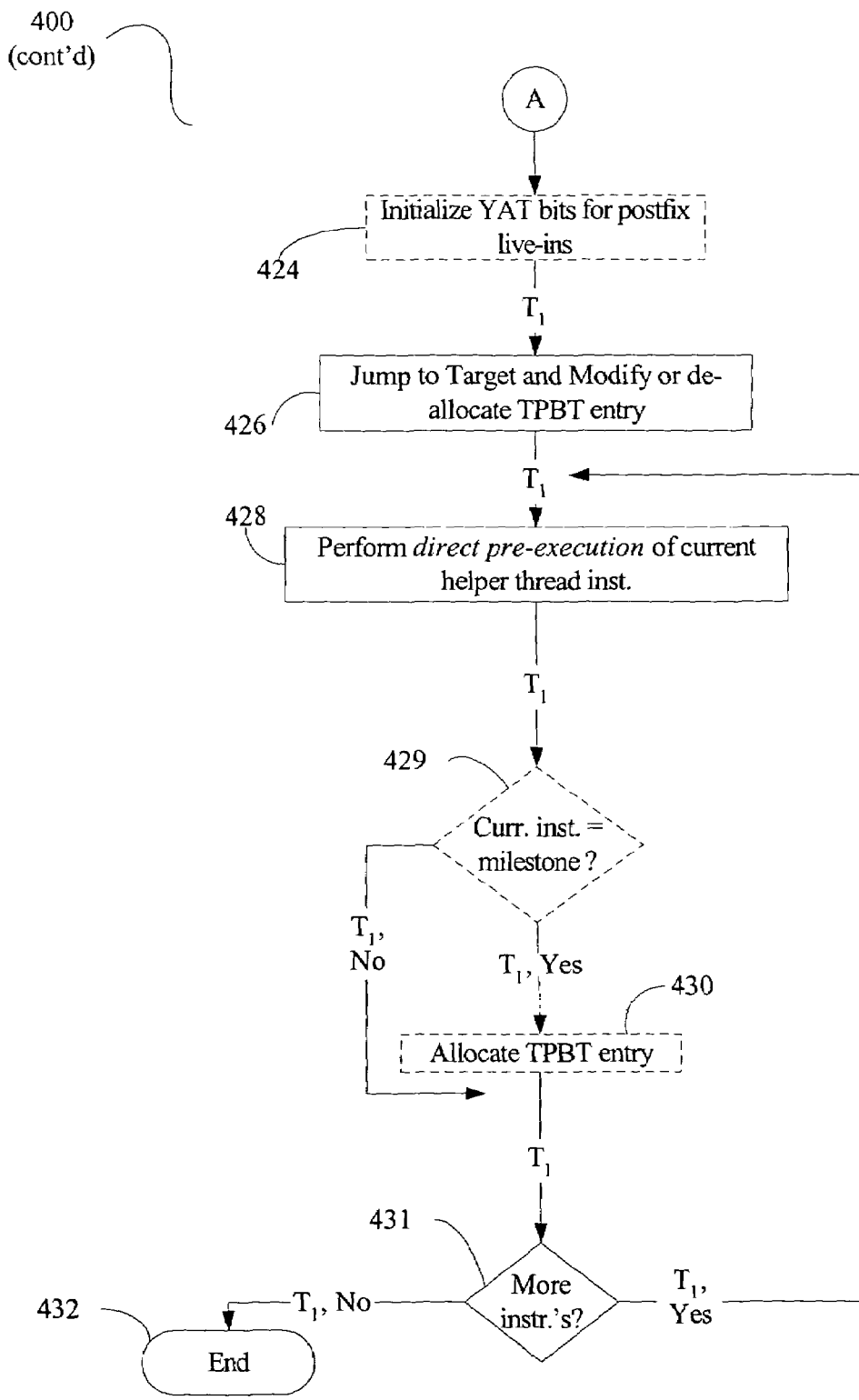

FIG. 4, including FIGS. 4a and 4b, illustrates at least one embodiment of a method 400 for performing efficient prescient instruction prefetching. For at least one embodiment, the method 400 is performed on a processor that supports multithreading such that a main thread ($T_0$) and a helper thread ($T_1$) may execute concurrently. For an embodiment of the method 400 performed on a processor that supports SMT, homogenous renamer logic 106 (FIG. 1) may be employed for all threads. In such embodiments the main thread $T_0$ operates normally by employing an assumption that all architectural registers for its thread context carry a "true" value for the YAT-bit.

The method 400 provides for marking 410 lagging helper thread instructions to be killed. The method 400 also provides that the helper thread, $T_1$, performs live-in precomputation 420 to determine live-in values at the target point 1104 (FIG. 8) and then performs direct pre-execution 428 to prefetch instruction information for the main thread, $T_0$.

Direct pre-execution is a technique of prescient instruction prefetching that does not require a prefetch buffer or special architectural support such as a counted instruction prefetch operation. For example, when provided a starting instruction address and number of cache blocks to prefetch, a counted instruction prefetch operation will fetch set of instructions into a closer level of instruction cache. In contrast, during direct pre-execution the helper thread $T_1$ directly executes instructions from the main program and thus fetches the instruction information for such instructions into a cache on behalf of the main thread $T_0$.

As used herein, the term direct pre-execution implies certain hardware features and also implies certain processing related to such hardware features. As will be discussed in further detail below, direct pre-execution implies, for at least one embodiment, the use of YAT or like bits to disregard ineffectual instructions in the helper thread's instruction stream.

As used herein, the term "instruction information" is meant to refer to instructions that can be understood and executed by the functional units 175. Instruction information may be stored in a cache (not shown). The cache may be implemented as an execution instruction cache or an execution trace cache. For embodiments that utilize an execution instruction cache, "instruction information" includes instructions that have been fetched from an instruction cache (such as I-cache 160 illustrated in FIG. 1) and decoded. For embodiments that utilize a trace cache, the term "instruction information" includes traces of decoded micro-operations. Although not illustrated in FIG. 1, such execution instruction cache or trace cache receives instructions from the I-cache 160 and provides instruction information, such as instruction 120 (which may be a micro-op in some embodiments) to renamer logic 106.

For embodiments that utilize neither an execution instruction cache nor trace cache, "instruction information" also includes raw bytes for instructions that may be stored in an instruction cache (such as I-cache 160 illustrated in FIG. 1).

Figure 8:
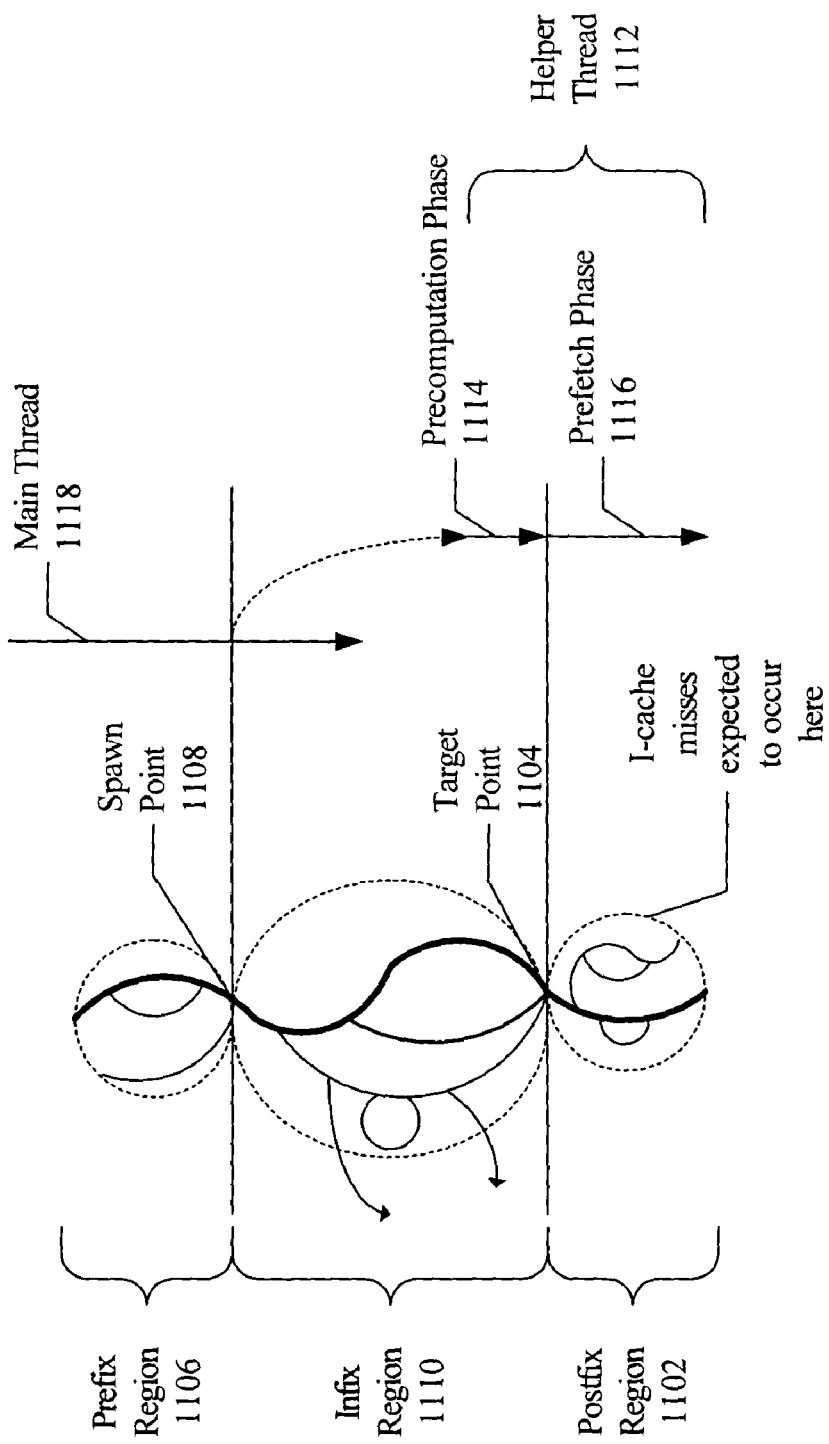
FIG. 8 is a diagram representing an illustrative main thread program fragment containing three distinct control-flow regions.

Brief reference to FIG. 8 is made for a further description of the postfix region of a main code thread, where the postfix region is to be executed by a helper thread during prescient instruction prefetching. FIG. 8 is a diagram representing an illustrative main thread 1118 program fragment containing three distinct control-flow regions. In the illustrated example, a postfix region 1102 following a target point 1104 is predicted to suffer heavy performance loss due to instruction cache misses. For simplicity in explanation, a region 1106 before a spawn point 1108 is called the prefix region 1106, and a region 1110 between the spawn point 1108 and target point 104 is called the infix region 1110.

As is stated above, direct pre-execution circumvents the need for prefetch buffer hardware. This is accomplished because, during prefetching, the helper thread follows the control flow in a specific region of the helper thread's code that is predicted to be followed by main thread during the main thread's future execution of the specific region. This specific region of the main thread's code is referred to herein as a "postfix region" 1102 (see FIG. 8). In order for the helper thread to accurately follow the control path that will be followed by the main thread, the branches in the postfix region 1102 (FIG. 8) should be accurately executed so that the helper thread does not diverge from the path that the main thread will traverse when it reaches the target point.

Effective instruction prefetch thus benefits from the helper thread's 1112 accurate resolution of branches in the postfix region 1102. To correctly resolve postfix branches, the outcome of the backward slice of each postfix branch should be accurately reproduced. This slice may include computation instructions from both the infix region 1110 and the postfix region 1102.

Accordingly, direct pre-execution implies that a helper thread 1112 may include two phases of execution. Specifically, the helper thread 1112 execution may include a precomputation phase 1114 and a prefetch phase 1116. During the precomputation phase 1114, the helper thread 1112 determines one or more live-in values in the infix region 1110 before starting to execute the prefetch phase 116 in the postfix region 1102. The instructions executed by the helper thread 112 during the precomputation phase 114 correspond to a subset (referred to as an "infix slice") of instructions from the main thread in the infix region 1110 that fall between the spawn point 108 and the target point 1104. This subset may include instructions to calculate data values upon which conditional branch instructions in the postfix region 1102 depend. Execution by the helper thread of the instructions in the precomputation phase 1114 reproduces the effect of infix code, that has been skipped by branching to the target point from the spawn point to begin execution of the helper thread, that relates to the resolution of branches in the postfix region 1102.

Instructions in the infix region 1110 that are not related to any branch instruction in the postfix region 1102 are considered to be ineffectual instructions. Ineffectual instructions in the infix region are excluded from the infix slice to be executed by the helper thread during the precomputation phase 1114.

During the prefetch phase 1116, the helper thread 1112 executes code in the postfix region 1102. Execution of code in the prefetch phase 1116 both resolves control flow for the helper thread 1112 in the postfix region 1102 and prefetches instructions for the main thread 1118. During both the precomputation phase 1114 and the prefetch phase 1116, the helper thread 1112 may execute Store instructions involved in computing values upon which branch instructions in the postfix region 1102 depend.

By excluding ineffectual instructions from the infix slice executed by the helper thread 1112 during the precomputation phase 114, ineffectual infix instructions are neither fetched nor executed. This approach usually enables the helper thread 1112 to reach the target point 1104 earlier than the main thread 1118 reaches it. Further description of techniques relevant to slice generation for instruction prefetching may be found in copending application Ser. No. 10/422,528, entitled "Methods and Apparatus for Generating Speculative Helper Thread Spawn-Target Points."

Returning to FIG. 4, it can be seen that, during prescient prefetching, multiple threads $T_0$, $T_1$ may be executing simultaneously. The flow of control associated with each of these multiple threads is indicated by the notations $T_0$ and $T_1$ on the edges between the blocks illustrated in FIG. 4. Although not illustrated in FIG. 4, one skilled in the art will recognize that multiple threads may be spawned from a non-speculative thread. Also, for at least one embodiment, a speculative thread may spawn one or more additional speculative successor threads.

It is assumed that a trigger instruction to cause a speculative helper thread $T_1$ to be spawned has been inserted into the main thread $T_0$ code at an appropriate spawning point(s). The trigger instruction can be a conventional instruction in the existing instruction set of a processor, denoted with special marks (or "hints"), such as a special offset (or immediate) value for the NOP instruction, assuming that a particular processing system will recognize the hint as a fork or spawn instruction. Alternatively, the trigger instruction can be a special dedicated instruction such as a fork or spawn instruction.

FIG. 4, specifically FIG. 4a, illustrates that operation of the method begins at block 402 and that a helper thread $T_1$ is spawned 404 when the main thread $T_0$ executes a trigger instruction at the spawn point 1108 (see FIG. 8). At block 416 initialization is performed for live-in values. A live-in value is a value that has been generated by the main thread $T_0$ and upon which the helper thread $T_1$ will rely during its execution. A register or memory value is considered "live-in" to a code region if the value is used before being defined in that region. In the helper thread, the infix slice executed during the precomputation phase 1114 (FIG. 8) is responsible for computing the set of live-in register and memory values for the postfix region instructions that will be executed by the helper thread during its prefetch phase 1116.

The illustrated placement of block 416 is optional in the sense that initialization of live-in values for the helper thread $T_1$ may optionally occur during execution of the main thread To, depending on the type of spawning mechanism employed. Accordingly, the actions described below as taken by the helper thread $T_1$ during initialization 416 may, for an alternative embodiment, be taken by main thread $T_0$. The optional placement of initialization 416 is indicated in FIG. 4 by broken lines.

During initialization 416, all entries in the map table 102 for the helper thread may also be initialized with a "false" value for YAT-bit field 116 (see FIGS. 1 and 2). The helper thread $T_1$ then initializes registers in the helper thread's context with live-in register values from the main thread. In addition to initializing live-in register values, YAT-bits for the live-in registers may also be initialized to a "true" value during renaming for the live-in registers.

For at least one alternative embodiment, YAT-bits for live-in registers are not individually initialized to a "true" value at block 416. For such embodiment, the live-in precomputation at block 420 proceeds on the assumption that all registers have a "true" YAT-bit value. YAT-bit initialization may then occur at block 424 after executing the instructions of the infix slice during the helper thread's live-in precomputation 420.

An advantage of the alternative embodiment that includes initializing YAT-bits at block 424 rather than at block 416 follows from the fact the precomputation slice instructions executed during live-in precomputation 420 are a subset of the instructions in the infix region 110 (FIG. 8). For instance, if YAT-bits are initialized at 416, a register used during precomputation 420 may be left with YAT-bit set to "true" at the end of live-in precomputation 420 even though subsequent code from the infix region, skipped by the infix slice, would have overwritten that register with a different value. Because the main thread $T_0$ does not skip these computations when executing 406 its instructions, the values seen at the target 1104 in the helper thread and the main thread may differ for this register. Broken lines in FIG. 4 denote the optional placement of YAT-bit initialization 424 after live-in precomputation 420, 422, rather than initializing YAT-bits for live-in registers along with live-in register value initialization at block 416.

The instructions that effect initialization 416 may be part of a prolog portion of the helper thread instructions. The prolog instructions are executed prior to execution of the infix slice instructions during the precomputation phase 1114 (see FIG. 8). As is stated above, such prolog instructions may be executed in the main thread $T_0$, depending upon the spawning technique employed at block 404.

For at least one embodiment, the instruction that effects initialization of live-in registers at block 416 and supports initialization of YAT-bits for live-ins at block 416 or block 424, is referred to herein as allocation instruction. For at least one embodiment, the allocation instruction is an instruction similar to the alloc instruction of the Itanium® and Itanium® 2 microprocessors. While the Itanium® and Itanium® 2 microprocessors issue instructions in-order, initialization 416 (or 424) may also be effected by an allocation instruction on out-of-order processors. The out-of-order embodiment is discussed below.

For both the in-order and out-of-order embodiments, the allocation initialization instruction utilizes a bit mask. The bit mask may be stored in the encoding of the initialization instruction itself. Alternatively, the bit mask may be stored as an immediate operand of the initialization instruction, or may be stored in a register or set of registers. As a result of the allocation instruction, all output registers of the main thread $T_0$ are not necessarily allocated as local registers for the helper thread $T_1$. Instead, the bit mask of the allocation instruction indicates the set of architectural registers to be used as live-in register values for the helper thread $T_1$.

During initialization 416 or 424, the value in the YAT field 116 for each of the live-in registers indicated by the bit mask is set to a "true" value in a respective entry 112 of the map table 102. (As is stated above in connection with FIGS. 1 and 2, each architectural register in an entry of the map table 102 is associated with a YAT-bit field 116.) In this manner, initial live-in YAT-bit initialization 416 or 424 is accomplished for the helper thread T1, either during execution of prolog instructions before the infix-slice precomputation phase 1114 of the helper thread's ($T_1$) execution, or between the infix-slice precomputation phase 1114 and the prefetch phase 1116.

For an embodiment of the method 400 performed on an out-of-order processor, it is assumed that an allocation instruction is provided by the processor's instruction set. Such instruction utilizes a register mask to pass hints to the map table 102. In out-of-order architectures, the map table 102 may be referred to as a Register Alias Table (RAT). Such hints may be utilized by the RAT to mark a subset of initial architectural registers to be used as live-in values for the helper thread.

For at least one alternative embodiment, initialization of live-in register values at block 416 is performed microarchitecturally and thus does not require any architectural modifications (such as implementation of an allocation instruction, if such an instruction does not already exist in the instruction set). For such embodiment, initialization of live-in values 416 is performed via a series of load instructions that copy live-in values from the main thread context to the helper thread context. During execution of such load instructions, renaming occurs as normal. During renaming for these live-in-copying load instructions, the YAT-bit for each of the renamed registers is automatically assigned to a "true" value.

For at least one embodiment, this alternative embodiment of initialization 416 is supported by code-layout conventions followed by the compiler when generating helper thread code. When generating instructions for the helper thread $T_1$, the compiler places the prolog load instructions for live-in copying and YAT assignment instructions at the beginning of the helper thread's code. These load instructions are followed by an instruction that causes initialization of the TPBT (see discussion of block 418, below). The TPBT initialization instruction serves as a hint to the helper thread $T_1$ to terminate automatic "true" YAT assignment and to begin YAT-based filtering as discussed below in connection with direct pre-execution 428.

FIG. 4 illustrates that, after live-in initialization is performed at block 416, processing for the helper thread $T_1$ proceeds to block 418. As with live-in initialization 416, block 418 may optionally be performed by the main thread $T_0$ during spawning of the helper thread $T_1$. The optional placement of block 418 is denoted by broken lines in FIG. 4.

At block 418, an entry in the thread progress beacon table 108 (FIGS. 1 and 2) is initially installed for the helper thread $T_1$. As is alluded to above, the installation 418 may be performed either by the helper thread $T_1$ when performing its prolog instructions or by the main thread $T_0$ during spawning 404. If installation 418 is performed by the main thread $T_0$ during spawning 404, the main thread $T_0$ incurs overhead associated with updating the TPBT 108 (FIGS. 1 and 2). In contrast, if installation 418 is performed by the helper thread T1, less overhead is incurred by the main thread $T_0$.

Helper-thread installation 418 may encourage more elaborate TPBT processing since the overhead for such processing is taxed to the helper thread $T_1$ rather than to the main thread $T_0$. For example, more diverse and elaborate termination conditions may be tracked in optional mode bits of TPBT entries (see 224, FIG. 2) in addition to the lag-kill condition tracked in field 223 if the TPBT entry is installed by the helper thread $T_1$ at block 418 instead of by the main thread $T_0$. In addition, information may be maintained in the TPBT to identify killer threads and to identify whether a kill condition was generated due to a lag-behind condition or some other condition (such as, for example, it has been determined that the helper thread is executing off-path in relation to the main thread's control path). Of course, even when TPBT entry installation 418 occurs in the main thread $T_0$, such additional information may be tracked in TPBT entries.

Reference to FIGS. 2 and 4 illustrates that, during TPBT installation 418, an entry of the TPBT 108 is allocated for the helper thread $T_1$ and the allocated entry is initialized. During such initialization, a beacon instruction address is installed into the instruction address field 220 of the allocated entry. For at least one embodiment, the beacon address installed during initialization 418 is the address of the target instruction (see 1104, FIG. 8) for the helper thread $T_1$ This target instruction address is the address of the target specified in the spawn-target pair identified for the helper thread $T_1$. Of course, one of skill in the art will recognize that the instruction address field 200 may be initialized to an instruction other than the target address.

For an embodiment that maintains a single TPBT to track thread progress of multiple helper threads, the thread ID field 222 of the allocated entry is initialized at block 418 with the thread ID for the helper thread $T_1$ In addition, the value in the lag-kill fields 223 is also initialized at block 418. For at least one embodiment, the lag-kill field 223 is a field whose value, if set to "true", indicates that the helper thread associated with that TPBT entry should be killed because it has "lagged behind" the helper thread. Accordingly, at installation 418 such field is initialized to a "false" value.

Other optional mode fields 224 may also be initialized. These optional mode fields 224 may be used to represent other thread kill conditions. For instance, one of the optional mode fields 224 may be used to reflect that the helper thread $T_1$ has veered from the control path followed by the main thread $T_0$. Such optional mode field is referred to herein as a "veer-kill" field. Also for example, one of the optional mode fields 224 may be used to reflect that the helper thread T1 has run too far ahead of the main thread $T_0$. Such fields are also initialized to "false" at block 418.

After initialization blocks 416 and 418 have been performed, processing of the helper thread $T_1$ proceeds to block 420, where the helper thread $T_1$ begins executing slice instructions during its live-in precomputation phase 1114 (FIG. 8).

In conjunction with execution of each instruction associated with live-in precomputation 420, the helper thread determines 422 whether the executed instruction is the last instruction in the infix slice for the helper thread's spawn-target pair. If so, then processing may proceed to optional block 424, or directly to block 426. Otherwise, processing proceeds to block 420 to continue executing infix slice instructions. One skilled in the art will recognize that the determination block 422 may occur before or after block 420.

FIG. 4b is referenced for further discussion of the method 400. At block 424, YAT-bit values are initialized for all registers that are live-in to the postfix slice associated with direct pre-execution 428 for the helper thread's prefetch phase 1116 (see FIG. 8). Processing then proceeds to block 426.

At block 426, the helper thread $T_1$ modifies its TBPT 108 entry to prevent the main thread $T_0$ from identifying a hit in the TBPT 108 as the main thread $T_0$ executes its instruction stream (see block 408, discussed below). For at least one embodiment, the helper thread $T_1$ de-allocates its TPBT entry 108 at block 426. Accordingly, when the helper thread $T_1$ finished live-in precomputation, it de-allocates its TBPT 108 entry to prevent the main thread $T_0$ from thinking that the main thread $T_0$ has reached the target point 1104 (FIG. 8) before the helper thread $T_0$ reached the target point 1104 (FIG. 8).

Rather than de-allocating the entire TPBT entry, the entry may be modified at block 426 if optional thread kill processing is to be applied to execution of the helper thread when it performs direct pre-execution 428 of the postfix region 1102.

Before leaving block 426, the helper thread $T_1$ executes a jump to the target instruction before beginning postfix direct pre-execution 428. One skilled in the art will note that blocks 424 and 426 can be performed either in the order shown in FIG. 4, or with 426 before 424, without affecting the operation of the subsequent direct pre-execution 428 phase.

The helper thread $T_1$ then performs direct pre-execution 428 of the postfix region 1102. While executing instructions for infix precomputation 420 and direct pre-execution 428, the helper thread $T_1$ may perform YAT-bit based filtering, which is discussed in further detail below.

Generally, when renaming a current instruction during infix precomputation 420 and/or direct pre-execution 428, the YAT-bit for each destination register of the current instruction is set to a "true" value in the map table 102 if the YAT-bit for all source register entries are set to a "true" value. If all source register entries are not "true," the value may be, depending upon details to be discussed below, either left unchanged or set to "false".

With reference to FIGS. 1, 2, 3 and 4, one skilled in the art will recognize that, during execution of a current instruction, instruction I, the stages of the pipeline 300 are performed. During the rename stage 308 for instruction I, a physical register 104 is allocated for each logical destination register written by instruction I. The entry 112 in the map table 102 corresponding to the logical destination register is updated so that the register identifier field 114 includes a pointer to the physical register 104 that has been allocated.

YAT-based filtering may be performed during the rename stage 308. That is, the value of the YAT-bit field 116 for the actual entry 208 for the logical destination register may be set, in accordance with method 500 or 600, as indicated below. The processing is performed for all logical destination registers indicated by instruction I. YAT-based filtering may be performed during the rename stage 308 for instructions executed during direct pre-execution 420. Also, such filtering may occur during live-in precomputation 420 if YAT-bit initialization has been performed at block 416.

Figure 5:
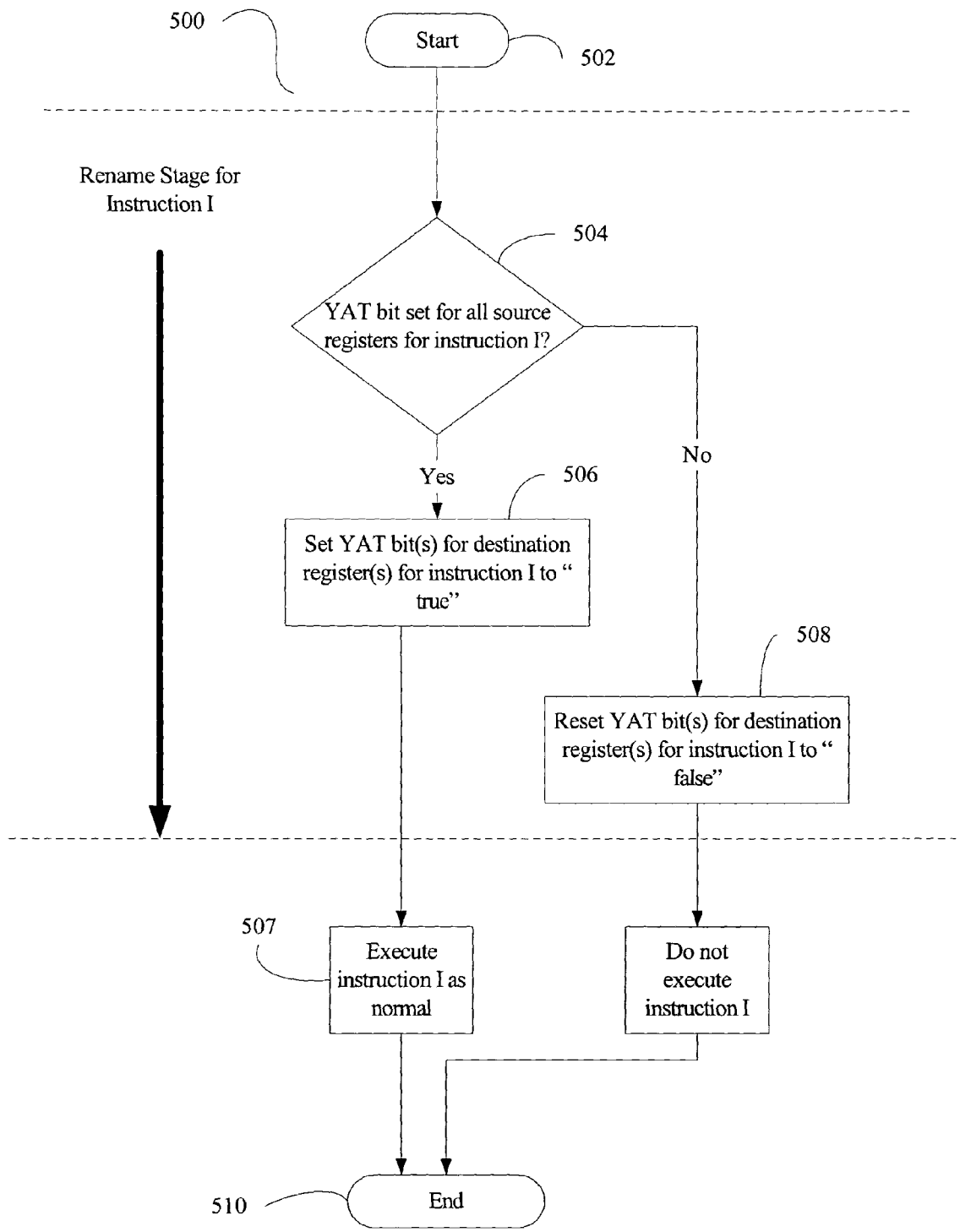
FIG. 5 is a flowchart illustrating at least one embodiment of a method for performing YAT-based filtering during directed prefetching.
Figure 6:
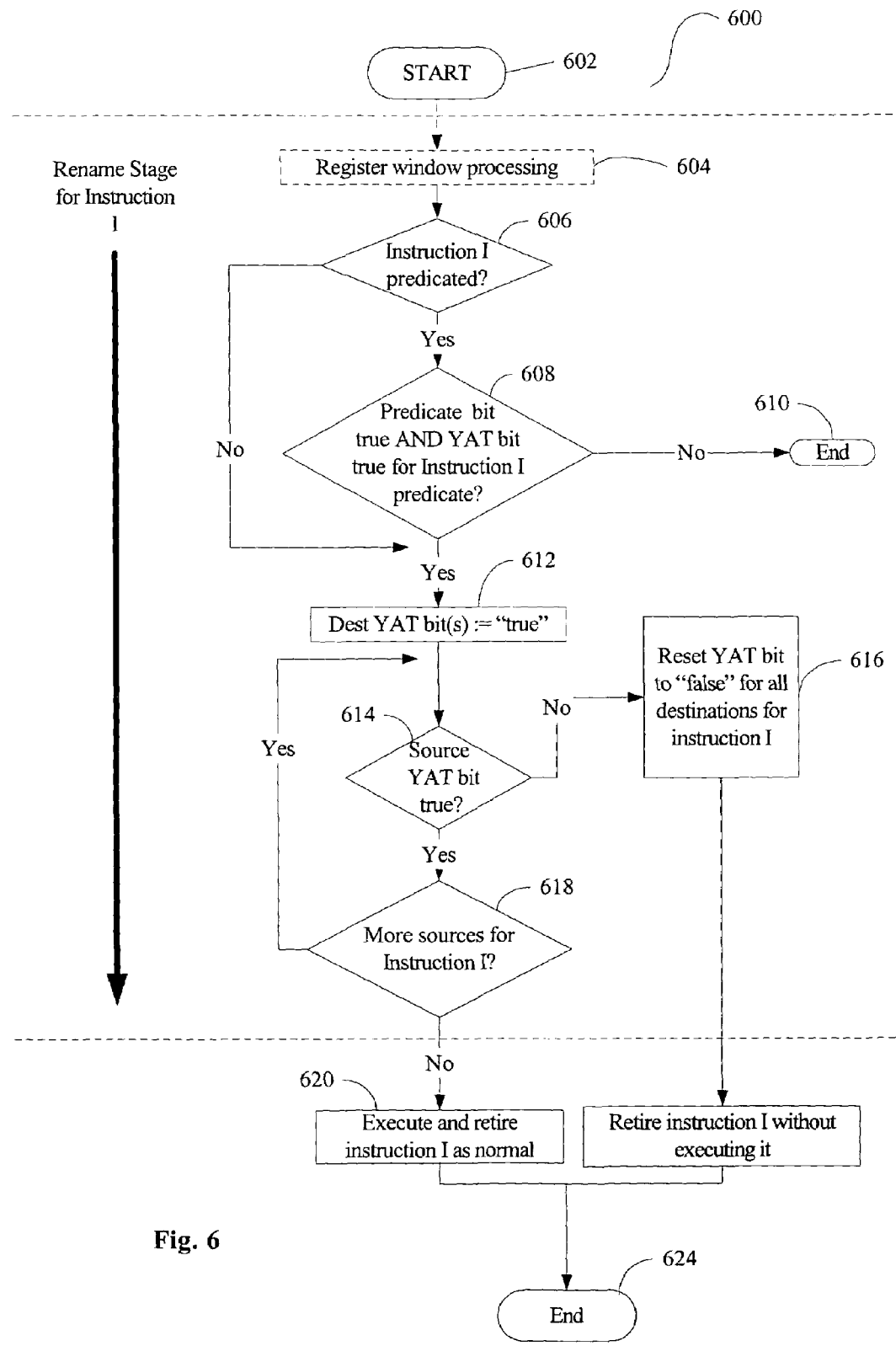
FIG. 6 is a flowchart illustrating at least one alternative embodiment of a method for performing YAT-based filtering directed prefetching.

FIGS. 5 and 6 provide additional detail regarding the processing that occurs for YAT-based filtering during direct pre-execution 428 (and during infix-precomputation 420 if YAT-bit initialization is performed at block 416) of a current instruction, instruction I. FIG. 5 is a flowchart illustrating a first embodiment 500 of a method for performing YAT-based filtering. For at least one embodiment, blocks 504, 506 and 508 of method 500 may be performed by renamer logic 106 (FIG. 1). FIG. 6 illustrates a second embodiment 600 of a method for performing YAT-based filtering. For at least one embodiment, blocks 604, 606, 608, 610, 612, 614, 616 and 618 of method 600 may be performed by renamer logic 106 (FIG. 1). In the following discussion, portions of FIGS. 5 and 6 are discussed together.

FIG. 5, with reference to FIG. 2, illustrates that processing of method 500 begins at block 502 and proceeds to block 504. At block 504 it is determined whether the YAT-bit is set to a "true" value in every source's entry 208 of the map table 102. If all sources for instruction I have their YAT-bit set to a "true" value, then processing proceeds to block 506. Otherwise, processing proceeds to block 508.

At block 506, the YAT-bit field 116 for the entry 208 of the map table 102 corresponding to the logical destination register(s) indicated by instruction I are set to a "true" value. In contrast, at block 508 the YAT field 116 for the entry 208 of the map table 102 corresponding to the logical destination register(s) indicated by instruction I are set to a "false" value.

FIG. 6 illustrates a second embodiment 600 of a method for performing YAT-based filtering during direct pre-execution 428 (and during infix-precomputation 420 if YAT-bit initialization is performed at block 416). The method 600 may be utilized for direct pre-execution 428 on a processor that utilizes predication. The method may also be used for infix-precomputation 420 on a processor that utilizes predication if YAT-bit initialization is performed at block 416. Optional block 604 of the method 600 may also be performed when performing direct pre-execution 428 (and infix-precomputation 420 if YAT-bit initialization is performed at block 416) on a processor that utilizes register windows.

FIG. 6, with reference to FIG. 2, illustrates that processing for method 600 begins at block 602. For processing systems that utilize register windows, processing proceeds to block 604. Otherwise, for processing systems that do not utilize register windows, processing proceeds to block 606.

At block 604, the method 600 may, depending upon the embodiment and upon the opcode of the current instruction being processed, perform processing related to maintaining register windows. For example, such register window processing 604 may be performed for embodiments implemented with the Itanium® and Itanium® 2 processors available from Intel Corporation. For such embodiments, the processing performed at block 604 preserves and restores the YAT-bit values associated with each predicate register in the subset of the predicate register file that may be copied to or from a general purpose register. The discussion, below, of FIG. 7 discusses this processing 604 in further detail. From block 604, processing proceeds to block 606.

At block 606 it is determined whether execution of the current instruction is predicated with a predicate bit. If so, then processing proceeds to block 608. Otherwise, processing proceeds to block 612.

At block 608, it is determined whether the predicate bit is true. It is also determined whether the YAT-bit for the predicate bit is true. If both of these conditions are true, then processing proceeds to block 612. Otherwise, processing ends at block 610.

If the predicate bit and the YAT-bit for the predicate bit are both determined at block 608 to be true, or if the current instruction is not predicated, then the YAT-bits for the destination register(s) indicated by instruction I are modified as indicated at blocks 612, 614, 616 and 618. In general, the YAT-bits for instruction I's destination register(s) are set to a "true" value if the YAT-bit for all source registers for instruction I are true. Otherwise, if the YAT-bit is false for any of instruction I's source registers (other than instruction I's predicate register which has been determined to be true at this point), the YAT-bit for each destination register indicated by instruction I is reset to a "false" value.

Such processing proceeds as follows. At block 612, the YAT-bit for each destination register indicated by instruction I is initialized to a "true" value. Processing proceeds to block 614, where it is determined, for a current source register indicated by instruction I, whether the YAT-bit for the current source register is set to a "true" value. If so, then processing proceeds to block 618 to determine if any additional source registers are indicated by instruction I. If so, then one of such additional registers is identified as the current source register and processing loops back to block 614. In this manner, block 614 is performed for all source registers.

If all source registers' YAT-bits are set to a "true" value, then processing proceeds to block 620 after it is determined at block 618 that the YAT-bit for all source registers indicated by instruction I have been examined. In this manner, the initialization performed at block 612 remains unchanged such that the YAT-bit for all destination registers indicated by instruction I remain set to a "true" value if all sources' YAT-bits are true.

If it is determined at block 614 that the YAT-bit for any source register of instruction I includes a "false" value, then processing proceeds to block 616. At block 616, the YAT-bit for each destination register indicated by instruction I is reset to a "false" value.

The actions taken at blocks 506 and 508 (FIG. 5) and blocks 612 and 616 (FIG. 6) may affect which of the remaining stages of the pipeline 300 (FIG. 3) are performed for instruction I. FIG. 5 illustrates that, after block 506 is executed, processing proceeds to block 507, where instruction I is executed normally before processing ends at block 624. Similarly, FIG. 6 illustrates that, after block 618 is executed, processing proceeds to block 620, where instruction I is executed normally before processing ends at block 624. In each case, instruction I proceeds to stages 310, 312, 314 and 314 as normal (see FIG. 3). Processing then ends at block 510 (FIG. 5) or 624 (FIG. 6).

In contrast, however, after block 508 (FIG. 5) or block 616 (FIG. 6) is executed, processing proceeds to block 510 (FIG. 5) or block 624 (FIG. 6), respectively, and ends without processing instruction I further through the pipeline. For such case, instruction I is considered completed because its destination's YAT-bit is set to a "false" value in the map table 102. Such treatment effectively nullifies instruction I from further pipeline processing such that instruction I does not proceed through the execution 312 and writeback 313 pipeline stages (see FIG. 3). In this sense, instruction I is not executed because it is not forwarded to the functional units 175.

The execution 312 and writeback 313 pipeline stages are denoted with dotted lines in FIG. 3 to indicate that such stages are not performed for instructions proceeding from block 508 and block 616. (For at least one embodiment, the pipeline 300 may be implemented so that instructions proceeding from block 508 and block 616 do not read operands during the read operands stage 310). In this manner, execution resources of the processor 101 (FIG. 1) are not consumed for ineffectual instructions.

For at least one embodiment, it can be expected that the bulk of those instructions that do not proceed to the execute 312 and writeback 313 stages (FIG. 3) are instructions encountered by the helper thread during its postfix phase, since ineffectual instructions are culled out of the infix slice during at least one embodiment of the slicing process.

Accordingly, it has been demonstrated that methods 500, 600 propagate the value of YAT-bits via the register renaming process. Such methods 500 and 600 filter out instructions in which at least one source operand does not carry a "true" value for its YAT-bit. Such instructions are deemed ineffectual and are nullified. As is discussed above, such instructions are nullified via removal from the pipeline 300. In an alternative embodiment, however, the ineffectual instructions may be replaced with NOPs and then proceed through the pipeline normally.

In either case, nullification reduces unnecessary contention with the main thread $T_0$ for core execution resources. For an embodiment of the method 400 implemented in an SMT system, resource contention may occur for Load/Store units 166 and other functional units 167 as well as physical registers and register port files. Even for embodiments wherein the method 400 is performed in a CMP system such that some of these resource contention issues are less severe, nullification also reduces unnecessary cache accesses.

To further discuss the nullification that may reduce resource contention among the main thread and helper thread, consider the following example code sequence. The code following <target> is the postfix region for a helper thread that is spawned when the main thread reaches the <spawn> instruction. In the example, p3 and p5 are predicate registers that control whether or not statement 2 and statement 4, respectively, are executed. Registers r1, r2 and r3 are general purpose registers:

```
<spawn> {executed by main thread T0}
...
{following instructions executed by helper thread T1:}
<target>
1                cmp      p3 = r1, r2
2       (p3)     add      r1 = ...
3*               cmp      p5 = r3, r1
4*      (p5)     br       X
```

In the example, two of the four instructions from a postfix region are leading to the resolution of a branch. These two instructions are indicated by asterisks. If these instructions were considered by a dynamic slicing algorithm, it might be determined that statement 2 is almost always found to be predicated false. That is, via profile information it could be determined that r1 is usually not updated in statement 2 because p3 is usually false. Hence, the dynamic slice algorithm considers both statement 1 and 2 ineffectual computations, and would effectively exclude them from the slice.

However, without the YAT-based filtering methods 500, 600, all instructions in the postfix region are executed by the helper thread. In particular, if the value of r2 is not precomputed during the helper thread's precomputation phase 1114 (see FIG. 8), then r2 effectively contains an arbitrary value in statement 1. Accordingly, the predicate for statement 2 may (incorrectly) be "true" when the helper thread executes it, resulting in an (incorrect) update to r1. This update to r1 potentially results in statement 3 computing the wrong value for p5. If p5 is wrong, the control-flow will diverge after statement 4, resulting in ineffective instruction prefetch. Accordingly, without the nullification provided by methods 500, 600, execution of the helper thread diverges from the path the main thread will follow (leading to inaccurate instruction prefetches).

Returning to FIG. 4b, it is seen that processing proceeds to block 429 from block 428 after the helper thread T1 has executed its current postfix-region instruction.

At blocks 429 and 430 optional processing is performed to detect whether the helper thread $T_1$ has veered from its intended path. Blocks 429 and 430 assume that a milestone instruction has been previously identified for the helper thread $T_1$ and that the helper thread T1 is aware of the instruction address for the milestone instruction. The milestone instruction is an instruction that is known to be outside the targeted scope for which the helper thread's instructions have been specialized.

If the helper thread $T_1$ determines at block 429 that it has reached the milestone instruction, it installs 430 a TPBT 108 entry having the instruction address of the milestone instruction in the instruction address field 220 of the TPBT entry. When the main thread $T_0$ checks for kill conditions (see block 408, discussed below), it checks to see if its next instruction pointer matches the milestone instruction address of the TPBT 108 entry. If so, then the main thread $T_0$ may indicate termination for the helper thread $T_1$ (see block 410, discussed below), because the helper thread $T_1$ has strayed from its intended path. One manner of indicating termination 410 is to set to "true" an optional veer-kill field (see 224) in the helper thread's milestone TPBT entry. (For such an embodiment, the veer-kill field is initialized to a "false" value during installation of the TPBT entry at optional block 430).

The helper thread $T_1$ continues to execute 428 its next instruction until it is determined at block 431 that no further instructions exist for the helper thread $T_1$ to execute during its prefetch phase 1116 (FIG. 8). Processing of the helper thread $T_1$ terminates at block 432 after the helper thread $T_1$ has determined at block 431 that it has executed all of its instructions.

FIG. 4a further illustrates main thread processing that occurs while the helper thread $T_1$ proceeds as described above. FIG. 4 illustrates that the main thread $T_0$ executes its next instruction at block 406. Upon retirement of the instruction during the retirement phase 314 (FIG. 3) the main thread $T_0$ provides its next instruction address to the TPBT 108. (For an alternative embodiment, the main thread $T_0$ may provide its next instruction address to the TPBT 108 during the fetch phase 304; indeed, the next instruction address at any particular stage of the pipeline may be used). The comparison logic of the TPBT 108 compares the main thread's next instruction address with the values in the instruction address fields 220 of the current TPBT entries. If a hit is encountered, it is determined at block 408 that a kill condition exists.

If it is determined at block 408 that a kill condition exists, processing proceeds to block 410. A kill condition may be detected, for instance, upon a hit in the TPBT 108 when a helper thread is lagging or when a helper thread has veered from its intended course. In such cases, the helper thread is unlikely to provide prefetching benefits for the main thread. However, it should be noted that computing incorrect values on the part of the helper thread does not harm program correctness of the main thread (assuming a mechanism to effectively prevent execution of Store instructions in the helper thread from affecting the architectural state of the main thread). Nonetheless, while killing such a helper thread is not necessary for program correctness, killing such a helper thread may relieve unnecessary resource contention.

At block 410 the main thread $T_0$ indicates that the helper thread associated with the TPBT 108 entry for which a hit was encountered should be terminated. The termination indication 410 may be handled in any of several manners.

For at least one embodiment, referred to herein as passive termination indication, the main thread $T_0$ marks the helper thread $T_1$ for termination by placing a "true" value in the helper thread's lag-kill indicator field 223 in the TPBT 108. For at least one other embodiment, referred to herein as active termination indication, the main thread $T_0$ causes an exception to be delivered to the helper thread $T_0$ be killed. For both the active and passive approaches, which are discussed in further detail below, block 410 may include de-allocating the helper thread's TBPT 108 entry so that further hits will not be encountered after the lagging helper thread is terminated.

For passive termination indication 410, the main thread $T_0$ merely marks the appropriate mode field 223, 224 for the helper thread's entry in the TPBT 108. Other than marking the mode field 223, 224, the main thread $T_0$ takes no further action during termination indication 410. The helper thread, on the other hand, polls the value of its mode fields 223, 224 periodically. For at least one embodiment, the helper thread polls its TBPT 108 entry via explicit execution of a status check instruction similar to the speculation check instruction (i.e., the "chk" assembly language mnemonic) provided by the architectures of the Itanium® and Itanium® 2 microprocessors available from Intel Corporation.

For the passive termination indication approach, the helper thread self-terminates upon determining, via a status check instruction, that one of its mode indicators in the TPBT 108 has been set to a "true" value. Under this approach, the helper thread synchronously polls the status of its kill indicator(s) by explicitly executing a status check instruction. If the helper thread detects a positive kill indicator in its TPBT entry, the helper thread self-terminates.

For the active termination indication approach, a determination at block 408 by the main thread $T_0$ that its next instruction pointer has hit in the TPBT results in delivery of an exception, at block 410, to the offending helper thread. The exception may be delivered in any known fashion, including a monitor write or an asynchronous interrupt. For at least one embodiment, the exception delivery system for delivering an exception to an offending helper thread is similar to the exception delivery system used by the ALAT of the Itanium® and Itanium® 2 microprocessors. However, since the exception is meant to terminate a helper thread, which is speculative in nature, the exception handling need not be precise. That is, the actual termination of the helper thread $T_1$ may be deferred without affecting the correctness of the main thread's $T_0$ execution.

The effect of the exception is that the offending helper thread is forcefully terminated (rather than the self-termination performed by the helper thread under the passive approach discussed above). Forceful termination resulting from an exception issued at block 410 may occur in the following manner. Instructions freshly fetched by the helper thread are tagged with the kill event. This kill event is processed during one of the final stages of the pipeline 300. For example, when the first such tagged instruction from the helper thread is processed at the retirement stage 314 of the pipeline, the helper thread is terminated.

As is illustrated above in connection with block 426, the helper thread may modify the TPBT 108 as it progresses. Accordingly, the helper thread may disable certain kill conditions as the helper thread makes progress such that the main thread $T_0$ does not detect the kill condition at block 408.

After performing the termination indication 410, processing for the main thread $T_0$ proceeds to block 412. Similarly, if no hit is encountered in the TPBT 108 at block 408, main thread $T_0$ processing proceeds to block 412.

At block 412, processing loops back to block 406 if the main thread $T_0$ has not completed execution of its instructions. If the main thread $T_0$ has completed its execution, then processing ends at block 414.

Figure 7:
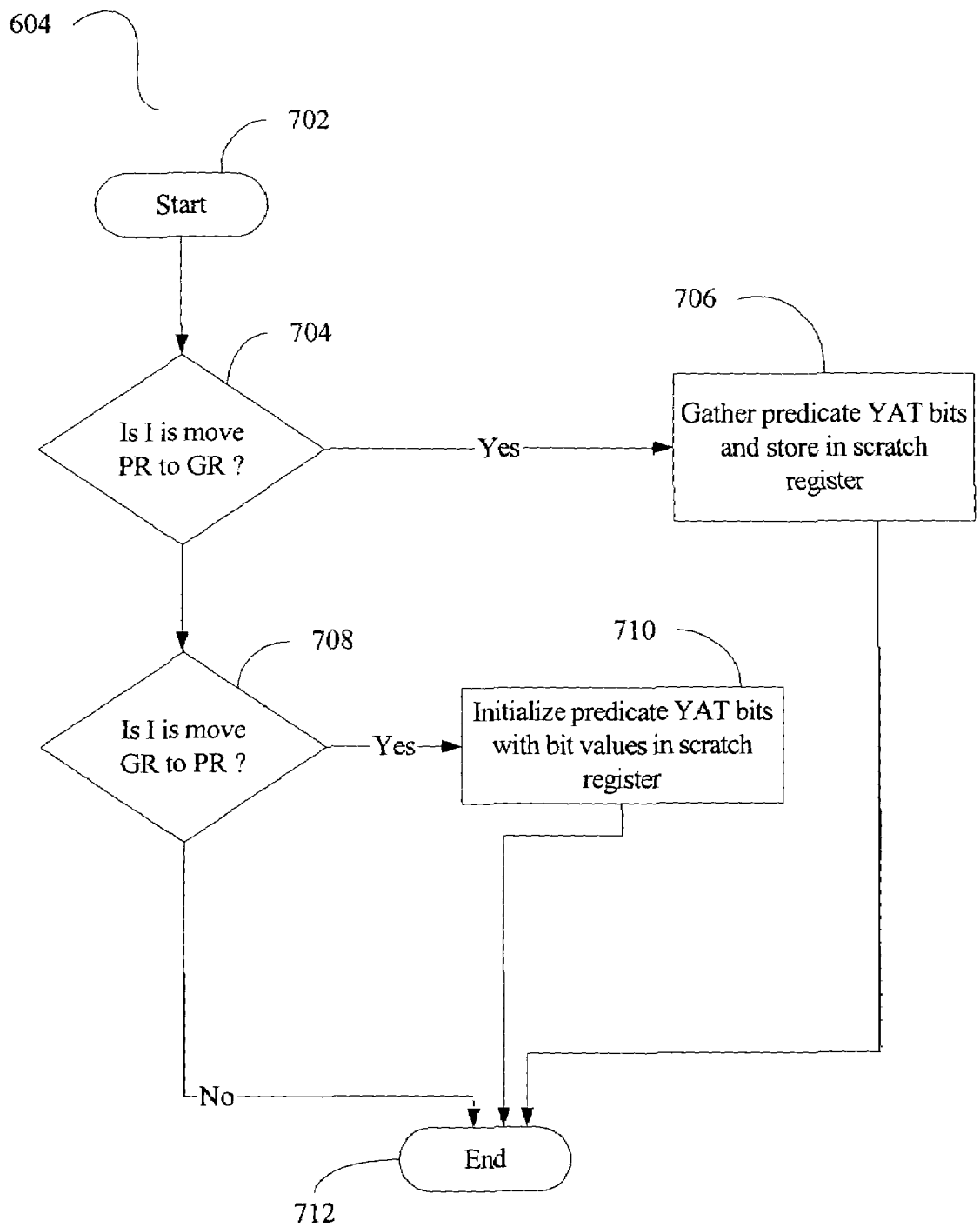
FIG. 7 is a flowchart illustrating at least one embodiment of a method for maintaining YAT-bit values for the bits of a predicate register.

FIG. 7 is a flowchart illustrating at least one embodiment of a method for performing register window processing 604 (FIG. 6). Generally, the method 604 determines whether the current instruction, instruction I, is a Move instruction to or from the set, or a subset of, predicate registers (referred to collectively as "PR"). A Move from PR to a 64-bit general register (GR) may occur, for example, when copying the predicate register to accommodate reuse of these registers during subroutines. For the Itanium® architecture, predicate registers are not automatically spilled and filled by the usual register stack mechanism. Rather, the set of predicate values are copied into a general purpose register that may be spilled via the register stack engine (e.g., register r32 to r127); they may still exploit the register stack engine albeit with some cooperation from the compiler.

Consider, for example, a case where Function A calls Function B. The hardware allocates Function B its own register frame. The hardware then creates overlaps between the registers which hold the outputs of function A and those that serve as the inputs of Function B. By writing information to these output registers A can now pass parameters to B without any overhead. B can pass values back to A by writing in these common shared registers as well. However, if nested calls have exhausted all the available 96 stacked registers then the contents of some of the stacked registers are automatically spilled from the register stack to memory (called the "register stack backing store") to free up register space for newly called nested functions. Thus, a Move instruction from PR to GR may occur. The "Move PR to GR" instruction is generated by the compiler when it infers that the predicate registers may be overwritten by a subroutine call and thus may need to be restored after that subroutine call returns. Also, when the register resources on the processor are available again after the subroutine call returns, the data that was temporarily held in the register stack backing store might be moved back into the stack registers. This is a situation where a compiler might generate a "Move from GR to PR" instruction to be executed at runtime by the processor.

If the mechanism to copy register values to or from the backing store is triggered during helper thread execution, the YAT-bit values associated with each of the bits of the predicate register should also be retained (upon a Move from PR to a general register) or restored (upon a Move from a general register to PR).

FIG. 7 illustrates that processing for the method 604 begins at block 702 and proceeds to block 704. At block 704 it is determined whether the current instruction is a Move instruction that copies the PR to a general register (GR). If so, processing proceeds to block 706. Otherwise, processing proceeds to block 708.

At block 706, the method 604 gathers the value of the YAT-bit associated with each bit of the PR and stores the combined values in a scratch register that is implicitly or explicitly associated with the destination general register. For at least one embodiment there is only one scratch register implicitly associated with all general registers. Processing then ends at block 712.

At block 708, it is determined whether the current instruction is a Move instruction that copies the contents of a general register (GR) to the PR. If so, processing proceeds to block 710. Otherwise, processing ends at block 712.

At block 710, the YAT-bit for each bit of the predicate register is restored to the value previously stored (at block 706 during a previous iteration of the method 604) in a scratch register that may be implicitly or explicitly associated with the source general register. Processing then ends at block 712.

The foregoing discussion discloses selected embodiments of an apparatus, system and methods for enhancing the efficiency of resource utilization during prefetch of instruction information via helper threads. The methods described herein may be performed on a processing system such as the processing system 100 illustrated in FIG. 1.

FIG. 1 illustrates at least one embodiment of a processing system 100 that may utilize disclosed techniques. System 100 may be used, for example, to execute one or more methods for enhancing effectiveness of resource utilization during instruction prefetching via speculative helper threads, such as the embodiments described herein. For purposes of this disclosure, a processing system includes any processing system that has a processor, such as, for example; a digital signal processor (DSP), a microcontroller, an application specific integrated circuit (ASIC), or a microprocessor. System 100 is representative of processing systems based on the Itanium® and Itanium® 2 microprocessors as well as the Pentium®, Pentium® Pro, Pentium® II, Pentium® III, and Pentium® 4 microprocessors, all of which are available from Intel Corporation. Other systems (including personal computers (PCs) having other microprocessors, engineering workstations, personal digital assistants and other hand-held devices, set-top boxes and the like) may also be used. At least one embodiment of system 100 may execute a version of the Windows™ operating system available from Microsoft Corporation, although other operating systems and graphical user interfaces, for example, may also be used.

Processing system 100 includes a memory system 150 and a processor 101. Memory system 150 may store instructions 140 and data 141 for controlling the operation of the processor 101. Memory system 150 is intended as a generalized representation of memory and may include a variety of forms of memory, such as a hard drive, CD-ROM, random access memory (RAM), dynamic random access memory (DRAM), static random access memory (SRAM), flash memory and related circuitry. Memory system 150 may store instructions 140 and/or data 141 represented by data signals that may be executed by the processor 101.

Processing system 100 includes a modified map table 102 that includes a YAT-bit field 116 for each entry slot 112. At least one embodiment of the processing system 100 also includes a thread progress beacon table 108 that stores address information to help track relative progress of a main thread and a helper thread. Though FIG. 1 shows a system with both a TPBT 108 and a modified rename table 102, one of skill in the art will recognize that either one may be practiced without the other. That is, alternative embodiments of processing system 100 may include only the disclosed enhancements for YAT-based filtering. Other embodiments of the processing system may include only the disclosed enhancements for detecting and killing inefficient helper threads.

In the preceding description, various aspects of a method, apparatus and system for performing instruction prefetching via speculative helper threads are disclosed. For purposes of explanation, specific numbers, examples, systems and configurations were set forth in order to provide a more thorough understanding. However, it is apparent to one skilled in the art that the described method and apparatus may be practiced without the specific details. It will be obvious to those skilled in the art that changes and modifications can be made without departing from the present invention in its broader aspects. While particular embodiments of the present invention have been shown and described, the appended claims are to encompass within their scope all such changes and modifications that fall within the true scope of the present invention.

What is claimed is:

1. A system comprising:
an instruction memory to store instructions for a first thread and to store instructions for a second thread;
a processor coupled to the memory, wherein the processor concurrently executes at least portions of the first and second thread, wherein the first thread executes a postfix region of the instructions to be executed by the second thread, the processor including:
a storage unit to hold one or more validity indicators, where each validity indicator is associated with an architectural register defined for the processor;
rename unit to generate a validity indicator value for each of one or more of the architectural registers, wherein the one or more of the architectural registers is indicated as a destination register by the current instruction;
execution unit to filter the current instruction for execution based on the value of the one or more validity indicators, wherein the execution unit further determines whether the current instruction should be executed through an execution pipeline stage, based on the value of the one or more validity indicators;

a thread progress beacon table to store progress information regarding the first thread; and a logic unit determining, based on the progress information, whether the first thread should be killed, said logic unit further determining whether the first thread is lagging behind the concurrent second thread, and terminating the lagging first thread.

2. A method comprising:

executing a non-speculative main thread while concurrently executing a speculative helper thread;

wherein concurrently executing the speculative helper thread further includes:

determining whether a current instruction of a helper thread is an ineffectual instruction, based on whether a destination register associated with the current instruction is expected to include valid data, wherein said determining further comprises initializing a valid bit to a "true" value for each of one or more registers containing input values to be utilized by the speculative thread;

declining to execute the instruction if it is an ineffectual instruction;

determining whether to forward the current instruction to a functional unit, based on the value of the valid bit corresponding to the destination register indicated by the current instruction;

determining if the speculative helper thread should be terminated; and during a rename stage of a pipeline:

determining whether every source register indicated by the current instruction is associated with a "true" value in a corresponding valid bit; and if so, setting a valid bit corresponding to a destination register indicated by the current instruction to a "true" value and executing the current instruction;

otherwise, setting the valid bit corresponding to the destination register indicated by the current instruction to a "false" value and inhibiting execution of the current instruction.

3. The method of claim 2, further comprising:

declining to permit the current instruction to be processed through an execution stage of the pipeline if the valid bit corresponding to the destination register indicates a "false" value.

4. The method of claim 2, further comprising:

permitting the current instruction to be processed through an execution stage of the pipeline if the valid bit corresponding to the destination register indicates a "true" value.

* * * * *

UNITED STATES PATENT AND TRADEMARK OFFICE
CERTIFICATE OF CORRECTION

PATENT NO. : 7,404,067 B2  Page 1 of 1
APPLICATION NO. : 10/658072
DATED : July 22, 2008
INVENTOR(S) : Tor M. Aamodt et al.

It is certified that error appears in the above-identified patent and that said Letters Patent is hereby corrected as shown below:

Title page, item (75) should read as follows:
(75)  Inventors: Tor M. Aamodt, Santa Clara, CA (US)

Signed and Sealed this

Thirteenth Day of April, 2010

David J. Kappos
*Director of the United States Patent and Trademark Office*